(12) United States Patent
Kim et al.

(10) Patent No.: US 11,137,199 B2
(45) Date of Patent: Oct. 5, 2021

(54) CERAMIC PLATE AND REFRIGERATOR INCLUDING SAME

(71) Applicant: Samsung Electronics Co., Ltd, Gyeonggi-do (KR)

(72) Inventors: Bum Soo Kim, Yongin-si (KR); Jung Hye Kang, Suwon-si (KR); Young Deog Koh, Seongnam-si (KR); Jin O Kwak, Suwon-si (KR); Noh Cheol Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 254 days.

(21) Appl. No.: 15/860,209

(22) Filed: Jan. 2, 2018

(65) Prior Publication Data

US 2018/0187958 A1    Jul. 5, 2018

(30) Foreign Application Priority Data

Jan. 3, 2017    (KR) ......................... 10-2017-0000552

(51) Int. Cl.
*F25D 23/06* (2006.01)
*B32B 5/02* (2006.01)
(Continued)

(52) U.S. Cl.
CPC ............ *F25D 23/063* (2013.01); *B32B 5/024* (2013.01); *B32B 7/12* (2013.01); *B32B 9/005* (2013.01); *B32B 9/007* (2013.01); *B32B 9/047* (2013.01); *B32B 27/34* (2013.01); *D03D 1/00* (2013.01); *D03D 13/008* (2013.01);
(Continued)

(58) Field of Classification Search
None
See application file for complete search history.

(56) References Cited

U.S. PATENT DOCUMENTS 4,630,826 A    12/1986    Nishigaki et al.
5,824,940 A *  10/1998    Chediak ................ F41H 5/0435
                                                    89/36.05
(Continued)

FOREIGN PATENT DOCUMENTS

EP    0162645 A1    11/1985
EP    0558693 A1     9/1993
(Continued)

OTHER PUBLICATIONS

Communication pursuant to Article 94(3) EPC dated Jan. 21, 2019 in connection with European Patent Application No. 17 210 080.2, 5 pages.

(Continued)

*Primary Examiner* — Shawn Mckinnon

(57) ABSTRACT

Disclosed herein are a ceramic plate to which an industrial fiber is attached to one surface thereof in order to reinforce the strength of a material and a refrigerator including the same. In accordance with one aspect of the present disclosure, a ceramic plate includes a porous ceramic substrate, an adhesive layer bonded to one surface of the porous ceramic substrate, and a reinforcement material layer bonded on the adhesive layer and formed of a fabric woven from at least one industrial fiber selected from the group consisting of an aramid fiber and a carbon fiber.

6 Claims, 5 Drawing Sheets

(51) Int. Cl.
| | |
|---|---|
| *B32B 7/12* | (2006.01) |
| *B32B 9/00* | (2006.01) |
| *B32B 27/34* | (2006.01) |
| *B32B 9/04* | (2006.01) |
| *F25D 11/02* | (2006.01) |
| *F25D 23/04* | (2006.01) |
| *F25D 23/08* | (2006.01) |
| *F25D 23/02* | (2006.01) |
| *F25D 25/02* | (2006.01) |
| *D03D 1/00* | (2006.01) |
| *D03D 13/00* | (2006.01) |
| *D03D 15/12* | (2006.01) |
| *D03D 15/513* | (2021.01) |
| *D06M 15/507* | (2006.01) |
| *D06M 15/643* | (2006.01) |
| *D06M 101/36* | (2006.01) |
| *D06M 101/40* | (2006.01) |

(52) U.S. Cl.
CPC ........... *D03D 15/513* (2021.01); *F25D 11/02* (2013.01); *F25D 23/021* (2013.01); *F25D 23/04* (2013.01); *F25D 23/066* (2013.01); *F25D 23/08* (2013.01); *F25D 25/025* (2013.01); *B32B 2262/0269* (2013.01); *B32B 2262/106* (2013.01); *D06M 15/507* (2013.01); *D06M 15/643* (2013.01); *D06M 2101/36* (2013.01); *D06M 2101/40* (2013.01); *D06M 2200/30* (2013.01); *D06M 2200/40* (2013.01); *F25D 2323/06* (2013.01)

(56) References Cited

U.S. PATENT DOCUMENTS

| | | | | |
|---|---|---|---|---|
| 6,011,080 | A * | 1/2000 | Daly | C09D 167/06 427/180 |
| 2003/0199215 | A1* | 10/2003 | Bhatnagar | B32B 27/04 442/135 |
| 2005/0085147 | A1* | 4/2005 | Homma | B29C 70/22 442/218 |
| 2009/0233508 | A1* | 9/2009 | Kubota | C08J 5/24 442/287 |
| 2009/0238964 | A1* | 9/2009 | Keller | C08G 77/56 427/177 |
| 2009/0305038 | A1* | 12/2009 | Duran | C04B 16/06 428/395 |
| 2010/0260998 | A1* | 10/2010 | Waicukauski | C09D 5/24 428/300.1 |
| 2011/0274888 | A1 | 11/2011 | Tang et al. | |
| 2014/0072785 | A1* | 3/2014 | Kaku | B32B 7/02 428/213 |

FOREIGN PATENT DOCUMENTS

| | | |
|---|---|---|
| GB | 2305998 A | 4/1997 |
| JP | 2009264692 A | 11/2009 |
| JP | 2012507459 A | 3/2012 |
| KR | 10-2009-0127578 A | 12/2009 |
| KR | 10-2013-0063900 A | 6/2013 |
| KR | 10-2016-0128025 A | 11/2016 |

OTHER PUBLICATIONS

European Search Report dated May 16, 2018 in connection with European Patent Application No. 17 21 0080.

* cited by examiner

CERAMIC PLATE AND REFRIGERATOR INCLUDING SAME

CROSS-REFERENCE TO RELATED APPLICATION

This application is related to and claims priority to Korean Patent Application No. 10-2017-0000552 filed on Jan. 3, 2017, the disclosure of which is incorporated herein by reference.

TECHNICAL FIELD

Embodiments of the present disclosure relate to a ceramic plate having one surface to which an industrial fiber is attached in order to reinforce the strength of a material and a refrigerator including the same.

BACKGROUND

In general, a ceramic plate is manufactured into a finished product by producing a disk layer and then subjecting the disk layer to treatment such as glazing, printing, and the like according to its use. The ceramic plate manufactured in such a manner is used for an interior material or exterior material for construction, and particularly, the exterior material for construction may include a glass fiber on one surface thereof for reinforcement of strength or treatment problems.

A glass fiber may be attached by means of hand layup, spray or an adhesive application method for treatment and strength reinforcement of a construction material. The spray and adhesive application methods are suitable for a mass production process because they are performed by an automated method, however, unlike the adhesive application method, the spray method has difficulties in quality management. Accordingly, it is preferable that a suitable method is selected according to the intent of a designer.

Meanwhile, when the adhesive application method is applied for attaching a glass fiber to a ceramic plate, it is possible to uniformly manage the properties of ceramic plate, however, there is a limitation in extending the application range of a ceramic plate. As an example, it is difficult for a glass fiber applied material to be used as a material for a refrigerator. When a glass fiber is attached to a ceramic plate, there is a problem in that the necessary properties required for application as the material for a refrigerator are not satisfied.

SUMMARY

To address the above-discussed deficiencies, it is a primary object to provide a ceramic plate having one surface to which an industrial fiber is attached in order to reinforce the strength of a material and a refrigerator including the same. Here, an aramid fiber or carbon fiber may be used as the industrial fiber, and the industrial fiber and the ceramic plate may be attached by a polyurethane adhesive using an adhesive application method.

Additional aspects of the disclosure will be set forth in part in the description which follows and, in part, will be obvious from the description, or may be learned by practice of the disclosure.

In accordance with one aspect of the present disclosure, a ceramic plate may include a porous ceramic substrate; an adhesive layer bonded to one surface of the porous ceramic substrate; and a reinforcement material layer bonded on the adhesive layer and formed of a fabric woven from at least one industrial fiber selected from the group consisting of an aramid fiber and a carbon fiber.

The fabric may be surface-treated with a surface treatment agent.

The fabric may be surface-treated with a surface treatment agent including a surface treatment component in the range of 1 to 3 wt % with respect to the total weight of the surface treatment agent.

The fabric may be formed of a fabric woven from the aramid fiber and surface-treated with a vinylester-based surface treatment agent.

The fabric may be formed of a fabric woven from the carbon fiber and surface-treated with a silane-based surface treatment agent.

The aramid fiber may include a p-aramid fiber produced by polymerizing p-phenylene diamine (PPD) and terephthaloyl chloride (TPC).

The fabric may be woven from an aramid fiber in the range of 2000 to 6000 denier.

The fabric may be formed of the aramid fiber having a warp- and weft-thread density of a×b. Here, each of a and b is an integer in the range of 13 to 20.

The fabric may be woven from a PAN-based 12K carbon fiber fabric provided using a PAN-based fiber as yarn.

The porous ceramic substrate may be compressed with a continuous high pressure belt press apparatus at high temperature to have a thickness of 3 to 6 mm.

The porous ceramic substrate may have a glossiness of 95 or more using grinding and glazing.

The porous ceramic substrate may have a percentage of an area occupied by pores per unit surface area in the range of 10 to 15%.

The porous ceramic substrate may include a glaze coated layer on one surface thereof.

The adhesive layer may be formed of an adhesive including polyurethane as a main component.

In accordance with another aspect of the present disclosure, a refrigerator may include an inner case formed of a ceramic plate; and an outer case coupled to an outer side of the inner case to form an exterior of the refrigerator, wherein the ceramic plate includes a porous ceramic substrate; an adhesive layer bonded to one surface of the porous ceramic substrate; and a reinforcement material layer bonded on the adhesive layer and formed of a fabric woven from at least one industrial fiber selected from the group consisting of an aramid fiber and a carbon fiber.

The fabric may be surface-treated with a surface treatment agent including a surface treatment component in the range of 1 to 3 wt % with respect to the total weight of surface treatment agent.

The fabric may be woven from an aramid fiber in the range of 2000 to 6000 denier to have a warp- and weft-thread density of a×b, and surface-treated with a vinylester-based surface treatment agent. Here, each of a and b is an integer in the range of 13 to 20.

The aramid fiber may include a p-aramid fiber produced by polymerizing p-phenylene diamine (PPD) and terephthaloyl chloride (TPC).

The fabric may be woven from a PAN-based 12K carbon fiber fabric provided using a PAN-based fiber as yarn, and surface-treated with a silane-based surface treatment agent.

The porous ceramic substrate may have a percentage of an area occupied by pores per unit surface area in the range of 10 to 15%.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Throughout the specification, like numerals denote like elements. The specification does not describe all the components of embodiments of the present disclosure, and general content in the field of art to which the present disclosure pertains or duplicate descriptions between the embodiments will be omitted.

Throughout this specification, when a certain part "includes" a certain component, it means that another component may be further included while not excluding any another component unless otherwise defined.

Throughout this specification, when a member is located on another member, it includes not only the case in which the member is in contact with another member but also the case in which another member is between the two members.

It should be understood that the terms "first," "second," etc. are used herein to distinguish one component from another, and the components should not be limited by the terms.

A singular expression includes a plural expression unless the context clearly indicates otherwise.

Hereinafter, operation principles of exemplary embodiments of the present disclosure will be described in detail with reference to the accompanying drawings.

The present disclosure relates to a ceramic plate having one surface to which an industrial fiber is attached in order to reinforce the strength of a material. In the present disclosure, a glass fiber which was previously applied to reinforce the strength of a ceramic plate is replaced with an industrial fiber such as an aramid fiber and a carbon fiber, and therefore the strength of a ceramic plate is improved and the application range is extended.

The ceramic plate according to the present disclosure may be applicable to various fields including a material for an inner case of a refrigerator, interior and exterior materials for electronic devices as well as interior and exterior materials for construction to which the existing ceramic plates have been applied. In the specification, the ceramic plate according to the present disclosure will be exemplified as a material for an inner case of a refrigerator for the sake of convenience, however, the application range of the ceramic plate is not limited thereto.

Hereinafter, a structure of a refrigerator to which the ceramic plate according to the present disclosure is applied will be described, and then a configuration and features of the ceramic plate according to the present disclosure will be described in detail.

Figure 1:
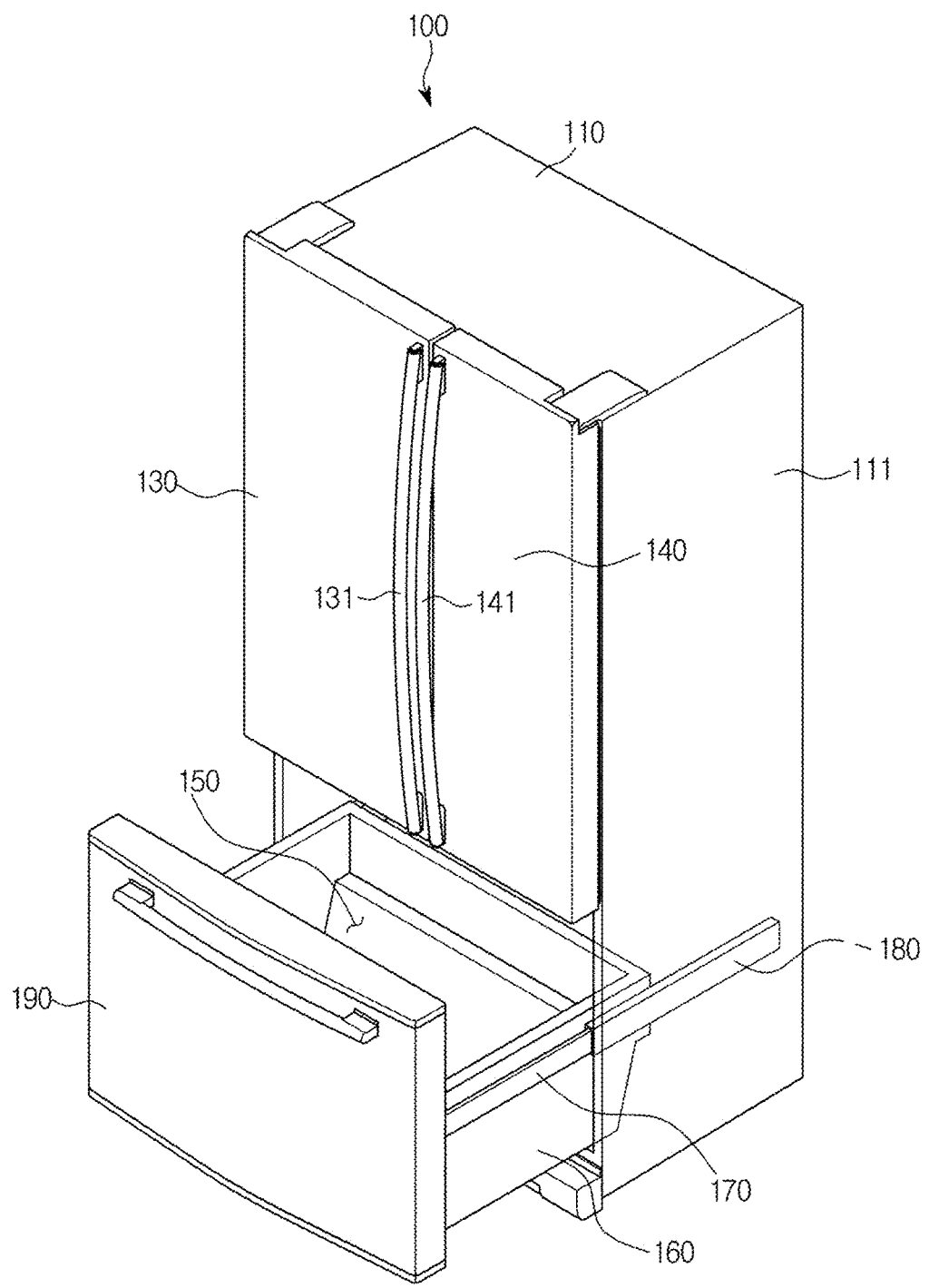
FIG. 1 is a view illustrating an exterior of a refrigerator according to one embodiment of the present disclosure.
Figure 2:
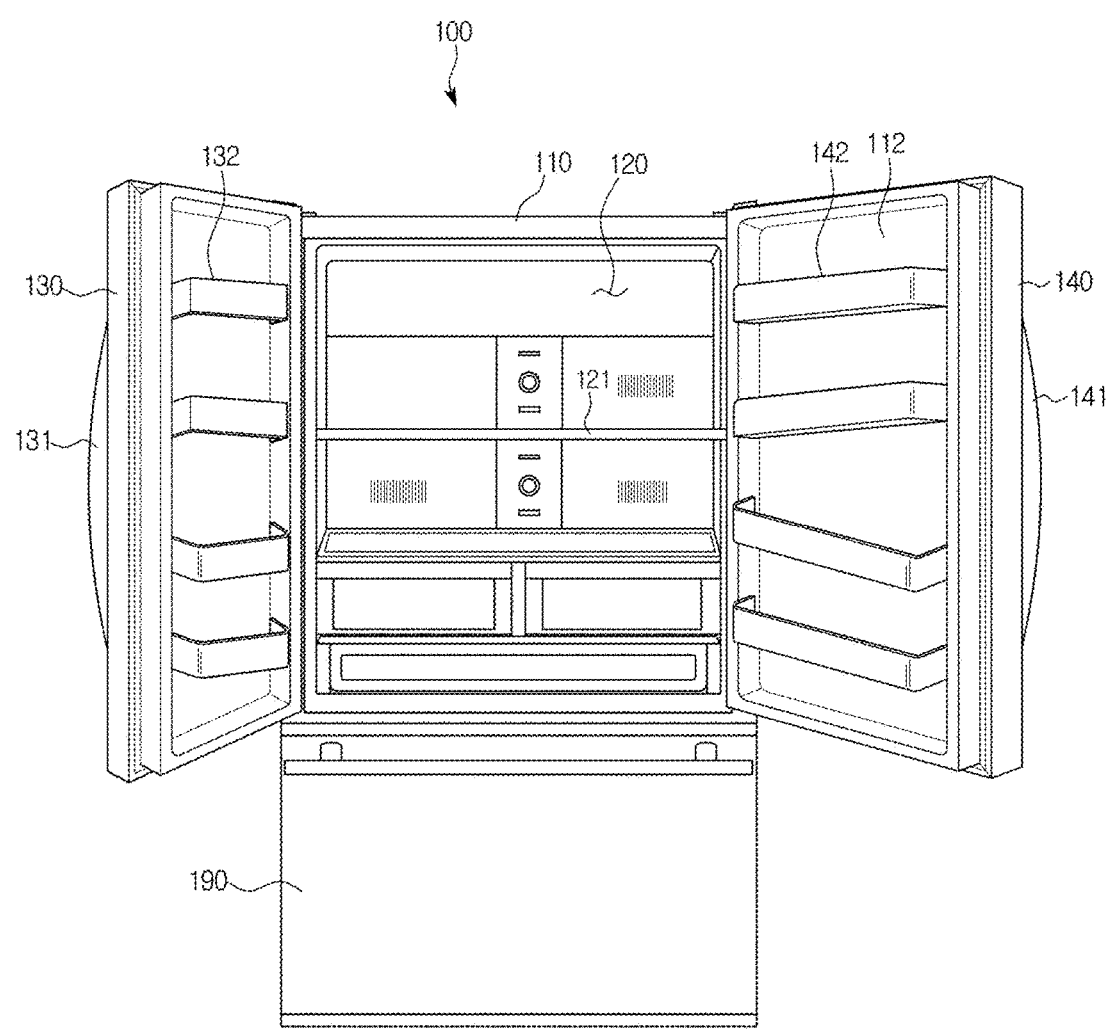
FIG. 2 is a view illustrating an interior of the refrigerator according to one embodiment of the present disclosure.

FIG. 1 is a view illustrating an exterior of a refrigerator 100 according to one embodiment of the present disclosure, and FIG. 2 is a view illustrating an interior of the refrigerator 100 according to one embodiment of the present disclosure.

Referring to FIGS. 1 and 2, the refrigerator 100 may include a main body 110, storage compartments 120 and 150 formed inside the main body 110, storage compartment doors 130, 140, and 190 which are rotatably provided on a front surface of the main body 110 and shield the storage compartments 120 and 150 from the outside, and a cool air supply device (not shown) for supplying cool air into the storage compartments 120 and 150.

The main body 110 may include an inner case 112 configured to define the storage compartments 120 and 150, an outer case 111 coupled to outer surfaces of the inner case 112, and an insulating material disposed between the inner case 112 and the outer case 111 to prevent an outflow of cool air from the storage compartments 120 and 150 and an inflow of external warm air into the storage compartments 120 and 150.

A machine room may be formed at a lower portion of the main body 110. Components including a compressor are accommodated in the machine room, and a refrigerant may be compressed by the compressor to have a high temperature and a high pressure.

The storage compartments 120 and 150 may be divided into an upper refrigerator compartment 120 and a lower freezer compartment 150 by an intermediate partition. The temperature of the refrigerator compartment 120 may be maintained at about 3° C., and the temperature of the freezer compartment 150 may be maintained at about −18° C.

The refrigerator compartment 120 is provided with an open front surface to accommodate food therein, and the open front surface may be opened or closed by a pair of refrigerator compartment doors 130 and 140 which are rotatably coupled to the refrigerator compartment 120 by hinge members (not shown). The refrigerator compartment doors 130 and 140 include a left door 130 for opening and closing a left side of the refrigerator compartment 120 and a right door 140 for opening and closing a right side of the refrigerator compartment 120. A shelf 121 allowing food to be placed thereon may be provided inside the refrigerator compartment 120.

Front surfaces of the refrigerator compartment doors 130 and 140 may be provided with refrigerator compartment door handles 131 and 141 for opening and closing the doors, and the refrigerator compartment door handles 131 and 141 may include a left door handle 131 for opening and closing the left side of the refrigerator compartment 120 and a right door handle 141 for opening and closing the right side of the refrigerator compartment 120. In addition, rear surfaces of the refrigerator compartment doors 130 and 140 may be provided with door guards 132 and 142 allowing food to be placed thereon, and the door guards may include a left door guard 132 provided on a rear surface of the left door and a right door guard 142 provided on a rear surface of the right door.

A freezer compartment 150 may be provided with an open front surface to accommodate food therein, and opened or closed by a freezer compartment door 190 provided to be slidingly movable forward and backward. A storage box 160 may be provided at a rear surface of the freezer compartment door.

Movable rails 170 may be coupled to the freezer compartment door 190 and the storage box 160 and slidably supported by fixed rails 180 formed on the main body 110. Therefore, the freezer compartment door 190 and the storage box 160 may be slidable into and out of the main body 110. A freezer compartment door handle may be provided at the front surface of the freezer compartment door 190 to open and close the freezer compartment door 190.

The cool air supply device may include a compressor (not shown) configured to compress a refrigerant, a condenser (not shown) configured to condense the refrigerant, a capillary tube (not shown) configured to expand the refrigerant, and an evaporator (not shown) configured to evaporate the refrigerant and produce cool air.

The structure of the refrigerator 100 according to the present disclosure has been described above. The example of the structure of the refrigerator 100 is not limited to FIGS. 1 and 2, and it should be understood in a broad sense that it may include modifications obvious to one of ordinary skill in the art.

A material for an inner case of the refrigerator 100 shown in FIGS. 1 and 2 will be described in detail below. A ceramic plate according to the present disclosure may be applied to the inner case 112 of the refrigerator 100.

Figure 3:
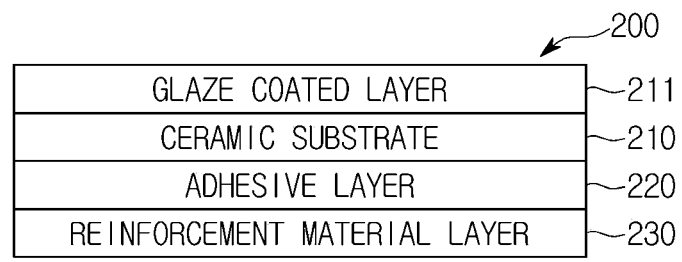
FIG. 3 is a view illustrating a structure of a ceramic plate according to one embodiment of the present disclosure.
Figure 4:
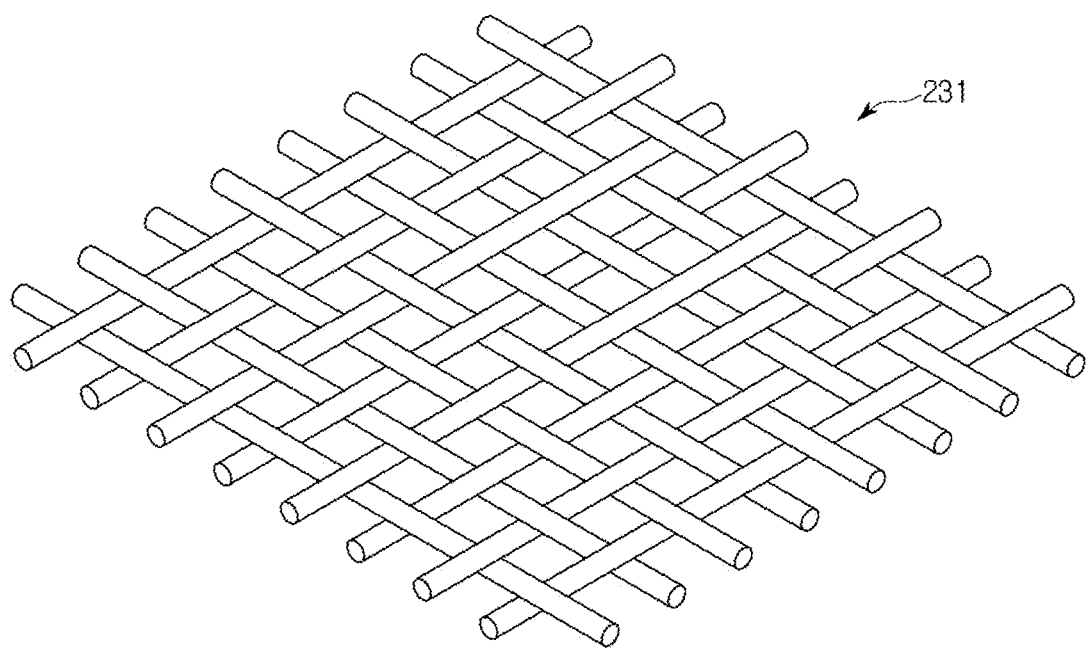
FIG. 4 is a view illustrating a structure of a reinforcement material applied to the ceramic plate according to one embodiment of the present disclosure.

FIG. 3 is a view illustrating a structure of a ceramic plate 200 according to one embodiment of the present disclosure, and FIG. 4 is a view illustrating a structure of a reinforcement material layer 230 applied to the ceramic plate 200 according to one embodiment of the present disclosure.

Referring to FIGS. 3 and 4, the ceramic plate 200 includes a porous ceramic substrate 210, an adhesive layer 220 bonded to one surface of the ceramic substrate 210, and a reinforcement material layer 230 which is bonded on the adhesive layer 220 and includes a fabric 231 formed of an industrial fiber.

The porous ceramic substrate 210 having a percentage of an area occupied by pores per unit surface area in the range of 10 to 15% may be used. Hereinafter, percentage of an area occupied by pores per unit surface area is referred to as porosity. However, the range of the porosity of the porous ceramic substrate 210 is not limited to the above-described example, and the range of the porosity may be suitably adjusted in order to adjust permeation of odors and coloring in some embodiments.

The porous ceramic substrate 210 may be compressed with a continuous high pressure belt press apparatus at high temperature to have a thickness of 3 to 6 mm. In addition, a glaze coated layer 211 may be bonded to one surface of the porous ceramic substrate 210, and in particular, the glaze coated layer may have a glossiness of 95 or more using grinding and glazing.

When the ceramic plate 200 is applied to the inner case 112 of the refrigerator according to the present disclosure, the glaze coated layer 211 formed on one surface of the porous ceramic substrate 210 may be disposed to face an inside of the storage compartment of the refrigerator, and the adhesive layer 220 and the reinforcement material layer 230 formed on the other surface of the porous ceramic substrate 210 may be disposed to face the outer case 111.

The adhesive layer 220 may be provided between the porous ceramic plate 210 and the reinforcement material layer 230 such that the porous ceramic plate 210 is adhered to the reinforcement material layer 230. The adhesive layer 220 may be provided such that an adhesive with polyurethane as a main component is applied to one surface of the porous ceramic substrate 210. Because an adhesive application method is applied for formation of the adhesive layer 220, the present disclosure is suitable for an automated mass production process where adhesion is uniformly performed and allows the properties of the ceramic plate 200 to be uniformly managed. However, the method of forming an adhesive layer is not limited to the adhesive application method, and may be performed by a hand layup method, a spray method, and the like.

The reinforcement material layer 230 is a layer provided to reinforce the strength of the ceramic plate 200 and may be formed of the fabric 231 woven from an industrial fiber. In the present disclosure, the reinforcement material layer 230 is formed of the fabric 231 woven from an industrial fiber including at least one of an aramid fiber and a carbon fiber.

The aramid fiber may include a p-aramid fiber produced by polymerizing p-phenylene diamine (PPD) and terephthaloyl chloride (TPC).

The process of polymerization of the p-aramid fiber may be expressed by Reaction Formula 1.

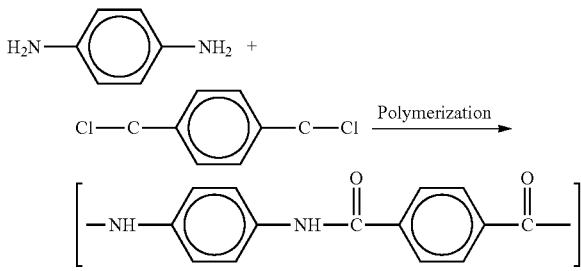

[Reaction Formula 1]

When the reinforcement material layer 230 is formed of a fabric woven from an aramid fiber, the fabric woven from an aramid fiber may be woven from an aramid fiber in the range of 2000 to 6000 denier to have a warp- and weft-thread density of a×b. Here, each of a and b is an integer in the range of 13 to 20. The reasons why the type of an aramid fiber is adopted as above will be described in experimental examples in detail below.

A carbon fiber may be formed of a PAN-based fiber as yarn.

Figure 5:
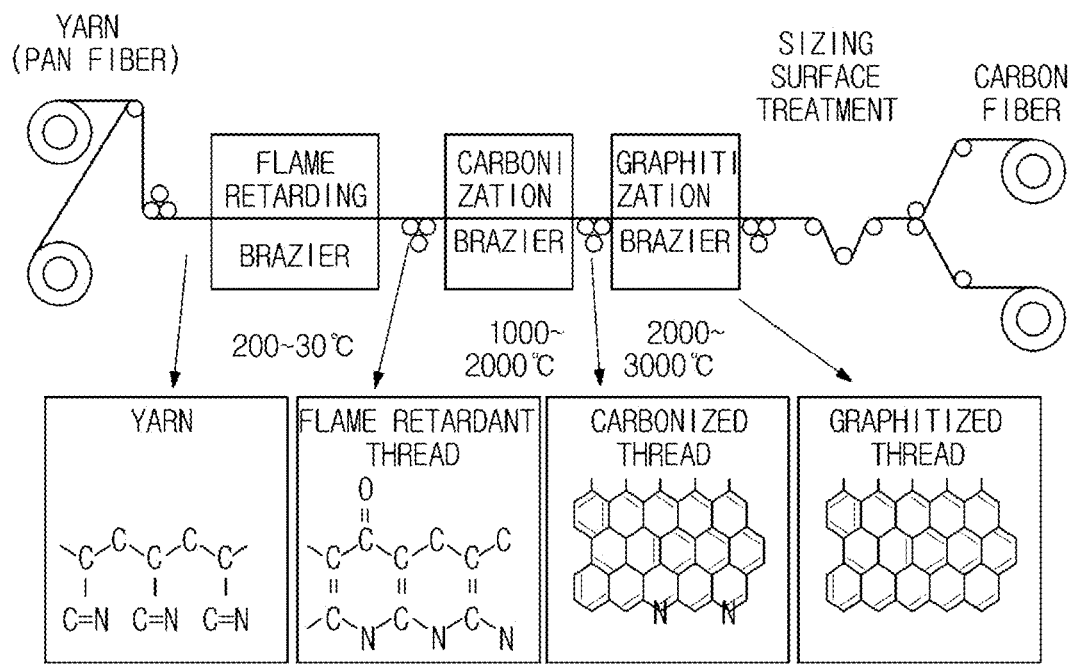
FIG. 5 is a schematic view illustrating a process of manufacturing a carbon fiber using a PAN-based fiber as yarn.

FIG. 5 is a schematic view illustrating a process of manufacturing a carbon fiber using a PAN-based fiber as yarn.

Referring to FIG. 5, a carbon fiber may be manufactured by the following method. First, the PAN-based fiber as yarn is provided to a flame retarding brazier having a temperature condition of 200 to 300° C., and the yarn passes through the flame retarding brazier so that a flame retardant thread is manufactured.

Subsequently, the flame retardant thread is provided to a carbonization brazier having a temperature condition of 1000 to 2000° C., and the flame retardant thread passes through the carbonization brazier so that a carbonized thread is manufactured.

Subsequently, the carbonized thread is provided to a graphitization brazier having a temperature condition of 2000 to 36000° C., and the carbonized thread passes through the graphitization brazier so that a graphitized thread is manufactured.

Subsequently, the graphitized thread passes through a process of sizing surface treatment to manufacture a carbon fiber.

When the reinforcement material layer 230 is formed of a fabric woven from the carbon fiber manufactured according to the method, the fabric woven from the carbon fiber may be formed of a 12K PAN-based fabric. The reasons why the type of a carbon fiber is adopted as above will be described in experimental examples in detail below.

The fabric 231 may be surface-treated with a surface treatment agent. In further detail, the fabric 231 may be surface-treated with a surface treatment agent including a surface treatment component in the range of 1 to 3 wt % with respect to the total weight of the surface treatment agent.

Here, a fabric formed of an aramid fiber may be surface-treated with a vinylester-based surface treatment agent, and a fabric formed of a carbon fiber may be surface-treated with a silane-based surface treatment agent.

According to the ceramic plate 200 manufactured in such a manner and the refrigerator 100 to which the ceramic plate 200 is applied, the following effects can be expected.

First, instead of a glass fiber, an industrial material is applied as a material for reinforcing the strength of a ceramic material, and therefore the present disclosure falls within the current standard range indicating that a glass fiber is unusable as a material for an inner case of a refrigerator, and a ceramic material can be applicable as the material for an inner case of a refrigerator.

Furthermore, the reinforcement material layer 230 is formed on one surface of the ceramic material using a fabric woven from an industrial material, and therefore the present disclosure can provide the ceramic plate 200 which satisfies the properties required for a material for an inner case of a refrigerator such as bending strength, free fall impact strength, and the like, and a refrigerator including the same.

The structures of the ceramic plate 200 and the refrigerator 100 to which the ceramic plate 200 is applied as a material for an inner case have been described above. Hereinafter, in order to assist an understanding of the present disclosure, the type of constituent components of the ceramic plate 200 and experiments for measuring the properties of the ceramic plate 200 depending on whether the corresponding components are surface-treated will be described in detail. Examples described below are only to facilitate understanding of the present disclosure, and the spirit of the present disclosure is not limited to the examples described below.

In the experiments, properties such as a bending strength of a ceramic plate, adhesive adhesion, and free fall strength are measured using variables such as types of material and surface treatment liquid which are applied to a reinforcement material layer of the ceramic plate.

For this, examples and comparative examples are designed as below.

Example 1

For a ceramic plate according to Example 1, a fabric woven from a 7300 de carbon fiber (12K 450P) as a type of an industrial fiber applied to a reinforcement material layer of the ceramic plate was used. The fabric woven from the carbon fiber was surface-treated with 1 to 3 wt % of a silane-based surface treatment agent and had a warp- and weft-thread density of 7×7.

Example 2

For a ceramic plate according to Example 2, a fabric woven from a 3000 de aramid fiber as a type of an industrial fiber applied to a reinforcement material layer of the ceramic plate was used. The fabric woven from the aramid fiber was surface-treated with 1 to 3 wt % of a vinylester-based surface treatment agent and had a warp- and weft-thread density of 13×13.

Comparative Example 1

For a ceramic plate according to Comparative Example 1, the same fabric as that of the ceramic plate according to Example 1 was applied to a reinforcement material layer of the ceramic plate except that the fabric woven from a carbon fiber was not surface-treated.

Comparative Example 2

For a ceramic plate according to Comparative Example 2, a fabric woven from a 1500 de aramid fiber as a type of an industrial fiber applied to a reinforcement material layer of the ceramic plate was used. The fabric woven from the aramid fiber was surface-treated with 1 to 3 wt % of a vinylester-based surface treatment agent and had a warp- and weft-thread density of 22×22.

Comparative Example 3

For a ceramic plate according to Comparative Example 3, the same fabric as that of the ceramic plate according to Example 2 was applied to a reinforcement material layer of the ceramic plate except that the fabric woven from an aramid fiber was not surface-treated.

Comparative Example 4

For a ceramic plate according to Comparative Example 4, a fabric woven from a 5300 de glass fiber was applied to a reinforcement material layer of the ceramic plate. Here, the fabric was formed of the glass fiber having a warp- and weft-thread density of 6.1×6.1.

Comparative Example 5

For a ceramic plate according to Comparative Example 5, a fabric woven from a 3000 de polyketone fiber was applied to a reinforcement material layer of the ceramic plate. Here, the fabric was formed of the polyketone fiber having a warp- and weft-thread density of 15.2×15.2.

The characteristics of the ceramic plates designed in Examples 1 and 2, and Comparative Examples 1 to 5 are listed in Table 1 below.

TABLE 1

| | Component of a reinforcement material layer | Denier | Whether a surface is treated | Fiber density (ea/inch) Warp thread | Fiber density (ea/inch) Weft thread |
|---|---|---|---|---|---|
| [Example 1] | Carbon fiber (12K 450P) | 7300 | 1 to 3 wt % of a silane-based surface treatment agent | 7.1 | 7.1 |
| [Example 2] | Aramid fiber (p-aramid) | 3000 | 1 to 3 wt % of a vinylester-based surface treatment agent | 13 | 13 |
| [Comparative Example 1] | Carbon fiber (12K 450P) | 7300 | No treatment | 7.1 | 7.1 |
| [Comparative Example 2] | Aramid fiber (p-aramid) | 1500 | 1 to 3 wt % of a vinylester-based surface treatment agent | 22 | 22 |
| [Comparative Example 3] | Aramid fiber (p-aramid) | 3000 | No treatment | 13 | 13 |
| [Comparative Example 4] | Glass fiber (E-Glass #570) | 5300 | No treatment | 6.1 | 6.1 |
| [Comparative Example 5] | Polyketone fiber (1-oxotrimethylene) | 3000 | No treatment | 15.2 | 15.2 |

The properties of the ceramic plates designed in Examples 1 and 2, and Comparative Examples 1 to 4 are measured using the following methods.

Bending Strength (JIS A 1509-4)

A standard 150×300 mm ceramic plate was manufactured and then placed on two supporting rods. Here, a length from a center of each supporting rod to an edge of the ceramic plate was about 5 mm. Subsequently, a load was applied to the ceramic plate at a rate of $(1\pm2)$ N/mm$^2$ every second using a pressurization rod installed at an upper middle of the two supporting rods, and a fracture load F, which is a maximum load at the time of breaking the ceramic plate, was calculated to measure a bending fracture load S and a bending strength R of the ceramic plate.

Adhesive Adhesion

A ceramic plate was manufactured by applying a polyurethane adhesive to a ceramic substrate and then adhering a test strip with a size of 25×200 mm thereto. When the adhesive was dried such that the test strip was bonded to the ceramic plate, the adhesion of the adhesive of the test strip to the ceramic substrate was measured by pulling one end of the test strip.

Free Fall Impact Strength

A ceramic plate was fixed at an upper end of a foam, and a free fall strength of the ceramic plate was measured by dropping a weight from an upper end of the ceramic plate. An impact strength applied to the ceramic plate was adjusted by changing a weight of the weight and a location from which the weight is dropped.

The characteristics of the ceramic plates designed in Examples 1 and 2, and Comparative Examples 1 to 5 are summarized and listed in Table 2 below.

TABLE 2

| | Bending strength | Adhesive adhesion | Free fall impact strength |
|---|---|---|---|
| [Example 1] | OK(1174N) | OK(70N) | OK(5J) |
| [Example 2] | OK(746N) | OK(51N) | OK(5J) |
| [Comparative example 1] | OK(822N) | OK(61N) | NG(4J) |
| [Comparative example 2] | NG(392N) | OK(48N) | NG(3J) |
| [Comparative example 3] | NG(588N) | OK(42N) | NG(3J) |
| [Comparative example 4] | NG(326N) | OK(82N) | NG(3J) |
| [Comparative example 5] | NG(271N) | NG(27N) | NG(1J) |

The requirements of each property in Table 2 were evaluated based on whether the corresponding ceramic plate is applicable to an inner case of a refrigerator. In detail, the properties of the ceramic plate were evaluated based on whether a bending strength of 600 N or more is exhibited, whether an adhesive adhesion of 30 N or more is exhibited, and whether an experimental condition for free fall impact strength of 5 J is satisfied.

The following results are deduced from the experimental results of Table 2.

First, in comparison of Examples 1 and 2, and Comparative Examples 4 and 5, when a fabric woven from an industrial fiber according to the present disclosure is applied to a reinforcement material layer, it is confirmed that appropriate properties of a ceramic plate are realized.

In detail, a carbon fiber and an aramid fiber as an industrial fiber were used in Examples 1 and 2, respectively, and a glass fiber and a polyketone fiber were used in Comparative Examples 4 and 5 instead of an industrial fiber according to the present disclosure, respectively. When the industrial fiber were used as in Examples 1 and 2, bending strengths of 1174 N and 746 N, adhesive adhesions of 70 N and 51 N, and a free fall impact strength of 5 J were exhibited, and therefore standards for required properties in experiments for bending strength, adhesive adhesion, and free fall impact strength are confirmed to be satisfied.

On the contrary, when the glass fiber was used as in Comparative Example 4, a bending strength of 326 N and a free fall impact strength of 3 J were exhibited, and thus standards for the required properties in experiments for bending strength and free fall impact strength are confirmed not to be satisfied. Further, when the polyketone fiber was used as in Comparative Example 5, a bending strength of 271 N, an adhesive adhesion of 27 N, and a free fall impact strength of 1 J were exhibited, and thus standards for the required properties in all the experiments for bending strength, adhesive adhesion, and free fall impact strength are confirmed not to be satisfied.

As a result of the experiments, a fabric woven from an industrial fiber according to the present disclosure is provided as a material of a reinforcement material layer, and thus the possibility of providing a ceramic plate having favorable properties is confirmed.

Next, in comparison of Examples 1 and 2, and Comparative Examples 1 and 3, when a fabric woven from an industrial fiber is subjected to surface treatment, it was confirmed that favorable properties of a ceramic plate are realized.

In detail, a fabric woven from an industrial fiber was surface-treated in Examples 1 and 2, and fabrics woven from a carbon fiber and an aramid fiber were not surface-treated in Comparative Examples 1 and 3, respectively. When the fabric was surface-treated as in Examples 1 and 2, bending strengths of 1174 N and 746 N, adhesive adhesions of 70 N and 51 N, and free fall impact strengths of 5 J were exhibited respectively, and therefore standards for the required properties in experiments for bending strength, adhesive adhesion, and free fall impact strength are confirmed to be satisfied.

On the contrary, when the fabric was not surface-treated as in Comparative Examples 1 and 2, a free fall impact strength of 4 J was exhibited in Comparative Example 1, and a bending strength of 392 N was exhibited in Comparative Example 2, and therefore standards for the required properties in experiments for free fall impact strength and bending strength are confirmed not to be satisfied.

As a result of the experiments, a fabric woven from a surface-treated industrial fiber is provided as a material of a reinforcement material layer, and thus the possibility of providing a ceramic plate having favorable properties is confirmed.

Next, upon comparison of the experimental results of Example 2 and Comparative Example 2, it is confirmed that application of an aramid fiber having a thickness of about 3000 de is preferable.

In detail, a 3000 de aramid fiber was used to manufacture a fabric in Example 2, and a 1500 de aramid fiber was used to manufacture a fabric in Comparative Example 2. When the 3000 de aramid fiber was used as in Example 2, a bending strength of 746 N, an adhesive adhesion of 51 N, and a free fall impact strength of 50 J were exhibited, and thus standards for the required properties in experiments for bending strength, adhesive adhesion, and free fall impact strength were confirmed to be satisfied.

On the contrary, when the 1500 de aramid fiber was used to manufacture a fabric as in Comparative Example 2, a bending strength of 392 N, an adhesive adhesion of 48 N, and a free fall impact strength of 3 J were exhibited, and thus standards for the required properties in experiments for bending strength and free fall impact strength are confirmed not to be satisfied.

As a result of the experiments, it was confirmed that a ceramic plate with favorable properties is provided when a fabric is woven from an aramid fiber having an appropriate thickness (about 3000 de) and then the fabric is applied to a reinforcement material layer.

Meanwhile, considering the denier and fiber density of Examples 1 and 2, it is confirmed that the fiber density for satisfying the required properties of the ceramic plate are similar to each other. Here, the fiber density may be evaluated with a numerical value obtained by multiplying numerical values of denier, and fiber densities of warp- and weft-threads. As a result of the experiments, it was confirmed that a ceramic plate with appropriate properties is provided when a fiber density similar to that of Examples 1 and 2 is exhibited.

As is apparent from the above description, the present disclosure can provide a ceramic plate and a refrigerator including the same because the ceramic plate falls within a current standard that a glass fiber is unusable as a material for an inner case of a refrigerator and satisfies conditions for the properties required for the material for an inner case of a refrigerator at the same time by applying an industrial material as a material for reinforcing the strength of a ceramic material instead of a glass fiber.

Examples of the present disclosure have been described above. The spirit of the present disclosure is not limited to the above-described embodiments, and it should be understood in a broad sense that modifications within the scope which is easily conceived of by one of ordinary skill in the art are included.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A refrigerator comprising:
   an inner case formed of a ceramic plate; and
   an outer case coupled to an outer side of the inner case to form an exterior of the refrigerator,
   wherein the ceramic plate includes:
     a porous ceramic substrate,
     an adhesive layer bonded to one surface of the porous ceramic substrate, and
     a reinforcement material layer bonded on the adhesive layer and formed of a fabric woven from at least one industrial fiber selected from the group consisting of an aramid fiber and a carbon fiber.

2. The refrigerator according to claim 1, wherein the fabric is surface-treated with a surface treatment agent including a surface treatment component in a range of 1 to 3 wt % with respect to a total weight of the surface treatment agent.

3. The refrigerator according to claim 2, wherein:
   the fabric is woven from an aramid fiber in a range of 2000 to 6000 denier to have a warp- and weft-thread density of a×b, and surface-treated with a vinylester-based surface treatment agent, and
   each of a and b is an integer in a range of 13 to 20.

4. The refrigerator according to claim 1, wherein the aramid fiber includes a p-aramid fiber produced by polymerizing p-phenylene diamine (PPD) and terephthaloyl chloride (TPC).

5. The refrigerator according to claim 1, wherein the fabric is woven from a PAN-based 12K carbon fiber fabric provided using a PAN-based fiber as yarn, and surface-treated with a silane-based surface treatment agent.

6. The refrigerator according to claim 1, wherein the porous ceramic substrate has a percentage of an area occupied by pores per unit surface area in a range of 10 to 15%.

* * * * *